US010110909B2

(12) United States Patent
Lapicque

(10) Patent No.: US 10,110,909 B2
(45) Date of Patent: Oct. 23, 2018

(54) TECHNIQUES FOR NONLINEAR CHROMINANCE UPSAMPLING

(71) Applicant: NVIDIA CORPORATION, Santa Clara, CA (US)

(72) Inventor: Olivier Lapicque, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 233 days.

(21) Appl. No.: 14/932,834

(22) Filed: Nov. 4, 2015

(65) Prior Publication Data
US 2017/0127068 A1 May 4, 2017

(51) Int. Cl.
*H04N 19/186* (2014.01)
*H04N 19/50* (2014.01)
*H04N 19/182* (2014.01)

(52) U.S. Cl.
CPC ......... *H04N 19/186* (2014.11); *H04N 19/182* (2014.11); *H04N 19/50* (2014.11)

(58) Field of Classification Search
None
See application file for complete search history.

(56) References Cited

U.S. PATENT DOCUMENTS

| 2003/0198292 | A1* | 10/2003 | Gold | H04N 11/042 |
| | | | | 375/240.01 |
| 2005/0030422 | A1* | 2/2005 | Leone | H04N 9/64 |
| | | | | 348/441 |
| 2005/0184993 | A1* | 8/2005 | Ludwin | G09G 3/3611 |
| | | | | 345/502 |
| 2009/0265721 | A1* | 10/2009 | Kyusojin | G06F 9/5011 |
| | | | | 719/321 |
| 2015/0109310 | A1* | 4/2015 | Ayanam | G06T 1/20 |
| | | | | 345/505 |

OTHER PUBLICATIONS

"Improved interpolation of 4:2:0 colour images to 4:4:4 format exploiting inter-component correlation", Maciej Bartowiak, 2004 12th European Signal Processing Conference, pp. 581-584.*
"Hybrid interpolation algorithm for reconstruction of sub-sampled chrominance components", Jong-Ho Kim, Hong lin Jin, Yoonsik Choe, 2011 IEEE International Conference on Consumer Electronics—Berlin (ICCE-Berlin), 2011, pp. 247-248.*

* cited by examiner

*Primary Examiner* — Janese Duley
(74) *Attorney, Agent, or Firm* — Artegis Law Group, LLP

(57) ABSTRACT

A subsystem configured to upsample a video data stream encoded in YCrCb format 4:2:0 (also termed YUV 4:2:0) performs an algorithm upon a two-by-two group of subsampled pixels. The subsystem computes an inside probability that the chrominance of a target pixel is a close match to the chrominance inside the group of four pixels. The subsystem further computes three weighting factors relating the chrominance of the target pixel to each of three adjacent pixels in an upsampled four-by-four pixel group. The subsystem then computes an outside estimate of the chrominance based on the weighting factors. Finally, the subsystem computes the chrominance of the target pixel based on the inside probability, the outside estimate, and the subsampled chrominance. The subsystem performs the algorithm upon all two-by-two groups of four pixels within a subsampled YUV 4:2:0 video data stream and generates an upsampled YUV 4:4:4 video data stream.

20 Claims, 7 Drawing Sheets

D4 = Y4' - Y5      D6 = Y4' - Y7

D5 = Y4' - Y6      D7 = Y4' - Y8

D(outside_1) = D4 + D5 + D6 + D7

$D12 = Y4' - Y9$  $\quad\quad D14 = Y4' - Y11$
$D13 = Y4' - Y10$ $\quad D15 = Y4' - Y12$ $D(\text{outside\_3}) = D12 + D13 + D14 + D15$ $W(\text{outside}) = 1 / (D(\text{outside\_1}) + D(\text{outside\_2}) + D(\text{outside\_3}) + \text{epsilon})$

TECHNIQUES FOR NONLINEAR CHROMINANCE UPSAMPLING

BACKGROUND OF THE INVENTION

Field of the Invention

Embodiments of the present invention relate generally to graphics processing and, more specifically, to techniques for nonlinear chrominance upsampling.

Description of the Related Art

In computer systems, in general, and in graphics processing units (GPUs), in particular, evolving technology affords manufacturers the ability to produce processors with increasing density that process data with increasing speed and efficiency. Higher data rates and streaming video magnify the importance of conserving bandwidth. Accordingly, efforts to reduce the amount of bandwidth required are increasingly advantageous.

A host system transmits a compressed stream to a client. The client then decompresses the stream. This compression/decompression scheme conserves bandwidth consumed between the host and the client. The amount conserved depends on the compression scheme used. Compression algorithms involve encoding the information contained in a stream of digital data in a manner that results in fewer data bits than the original data stream. Fewer data bits results in reduced bandwidth requirements for data transmission and reduced memory capacity requirements. Many compression algorithms exist.

A typical digital video signal may exist in a raw format known as RGB8, which includes 8 bits for the red content, 8 bits for the green content, and 8 bits for the blue content. An alternate format for digital video is termed YCrCb, where the Y term represents the luminance, or brightness of the signal, and the Cr term represents the red chrominance, or color content, and the Cb term represents the blue chrominance. An alternate term for YCrCb is YUV, where U corresponds to the Cr term, and V corresponds to the Cb term. RGB and YUV sampling schemes are described by a three part ratio, A:B:C, which defines a conceptual region A pixels wide and B pixels high in which there are C possible changes in chrominance between rows. Thus, the YUV 4:4:4 scheme includes a four-by-four array of pixels with four possible changes in chrominance between rows. The relationship between RGB and YUV is described in Equations 1 through 3. Each of the components of the YUV format is a linear sum of the RGB components weighted by different coefficients, as set forth in the following equations:

$$Y = 0.299R + 0.587G + 0.114B \quad (1)$$

$$U = -0.147R - 0.289G + 0.436B \quad (2)$$

$$V = 0.615R - 0.515G + 0.100B \quad (3)$$

As shown in equation 1, the coefficients of the Y term are positive and sum to one. There is, therefore, a close correlation between luminance, Y, and color, RGB. The human visual system is more sensitive to light intensity than to color variation or color contrast. Accordingly, one compression algorithm, known as YUV 4:2:0, defines a conceptual region four pixels wide and two pixels high in which there are only two possible changes in chrominance between rows. YUV 4:2:0 effects a two-to-one compression of video data. The Y term, or luminance, is included at full resolution. The U and V terms are included at one-quarter resolution.

YUV 4:2:0 is an effective compression technique because the reduction in chrominance resolution is not typically apparent to the viewer of the video. Many video formats are encoded as YUV 4:2:0 including MPEG, JPEG, DVD video and Blu-ray, PAL DV, and HDV among others. However, conversion to YUV 4:2:0 is only one example of subsampling. The drawbacks described herein apply to any such conversion scheme.

A video signal in RGB 4:4:4 format may be converted to YUV 4:4:4 format and subsampled to YUV 4:2:0 format. The signal in YUV 4:2:0 format is then transmitted to the client. The client, then, upsamples the signal in YUV 4:2:0 format to compensate for the missing chrominance information and constructs a signal in YUV 4:4:4 format that is then converted to RGB 4:4:4 format. This approach is typically used for transmitting video and streaming games and works well for natural video, in which the content is of real live scenes and motion.

One drawback of the above approach arises when transmitting and displaying rendered video. In certain types of applications, especially computer-aided design (CAD) applications that include fine lines, sharply defined edges, and text, sharp lines tend to get washed away due to subsampling and then upsampling. In particular, a single line includes a significant amount of high contrast spatial content. The subsampling process includes low pass box filters that attenuate the high frequency spatial content inherent in fine detail video. Upsampling a subsampled black line on a white background, that is, a high contrast pixel arrangement, may result in averaging the chrominance over several pixel blocks. The resulting recovered video may render the area where the black line overlays the white background as a grayish, fuzzy line, as opposed to a clear black line with good definition.

As the foregoing illustrates, what is needed in the art is a more effective technique for up-sampling compressed video.

SUMMARY OF THE INVENTION

One embodiment of the present invention sets forth a computer-implemented method for upsampling compressed, the method comprising receiving an encoded video data stream, identifying a first pixel within the encoded video data stream, determining a first chrominance of the first pixel, computing a probability that a second chrominance for a second pixel within a decoded video stream is equal to the first chrominance, and computing the second chrominance wherein the second chrominance is based on the probability and the first chrominance.

At least one advantage of the disclosed approach is that rendered video is upsampled as a statistically more accurate representation of the full resolution source video.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
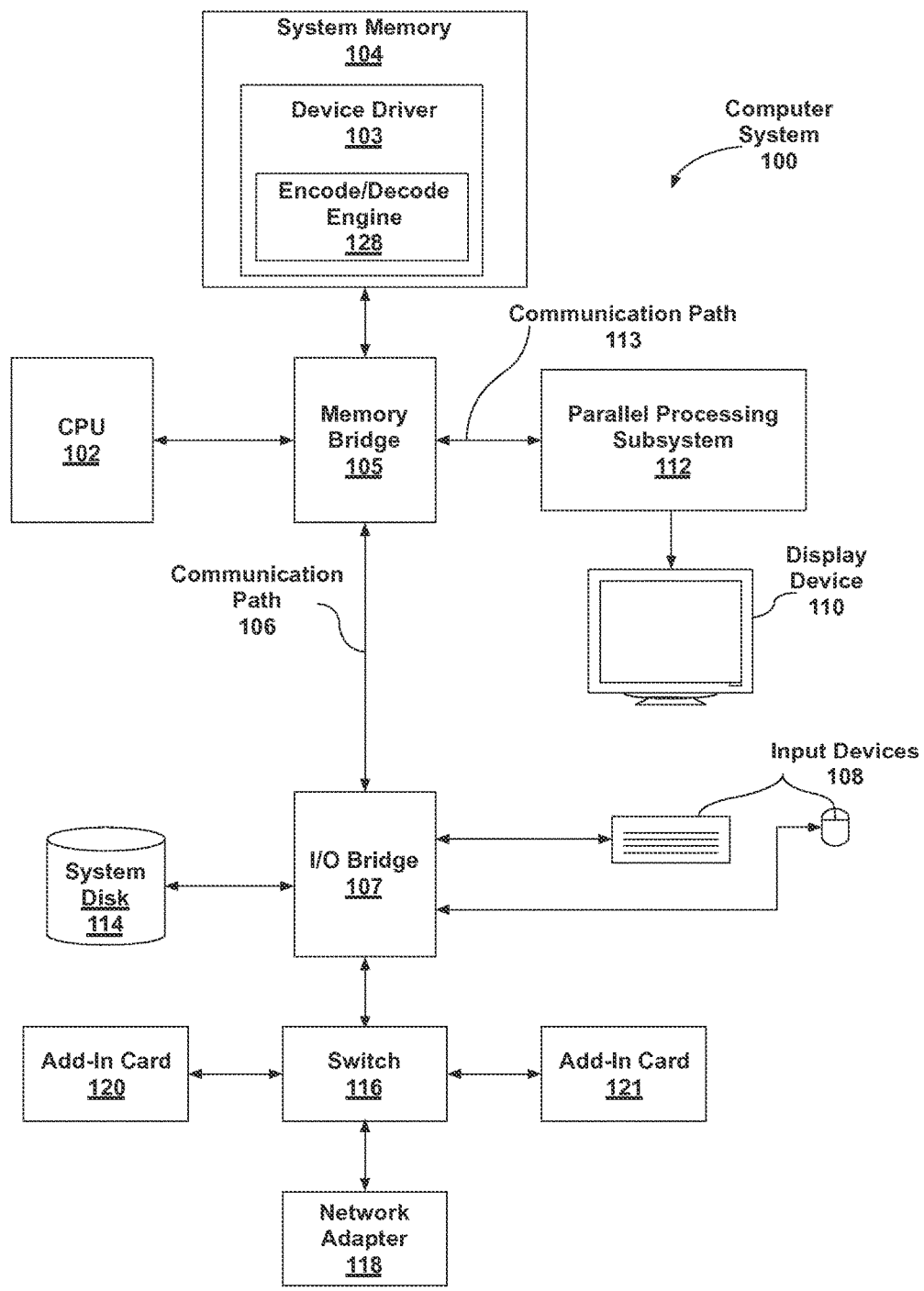
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

As also shown, device driver 103 includes encode/decode engine 128. In operation, encode/decode engine 128 is configured to perform compression and decompression of data in memory bridge 105 that is sent and received, respectively, via parallel processing subsystem 112. In operation, encode/decode engine 128 typically receives full resolution video data in RGB 4:4:4 format and converts the data to a YUV 4:4:4 formatted stream. Encode/decode engine 128 then subsamples the YUV 4:4:4 stream to generate a YUV 4:2:0 compressed data stream for transmission at reduced data rate, thus conserving bandwidth. As described in greater detail in conjunction with FIGS. 3 through 7, encode/decode engine 128 may receive compressed data in YUV 4:2:0 format. Encode/decode engine 128 then upsamples the YUV 4:4:0 stream to generate a YUV 4:4:4 stream that may be converted to RGB 4:4:4 for display.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
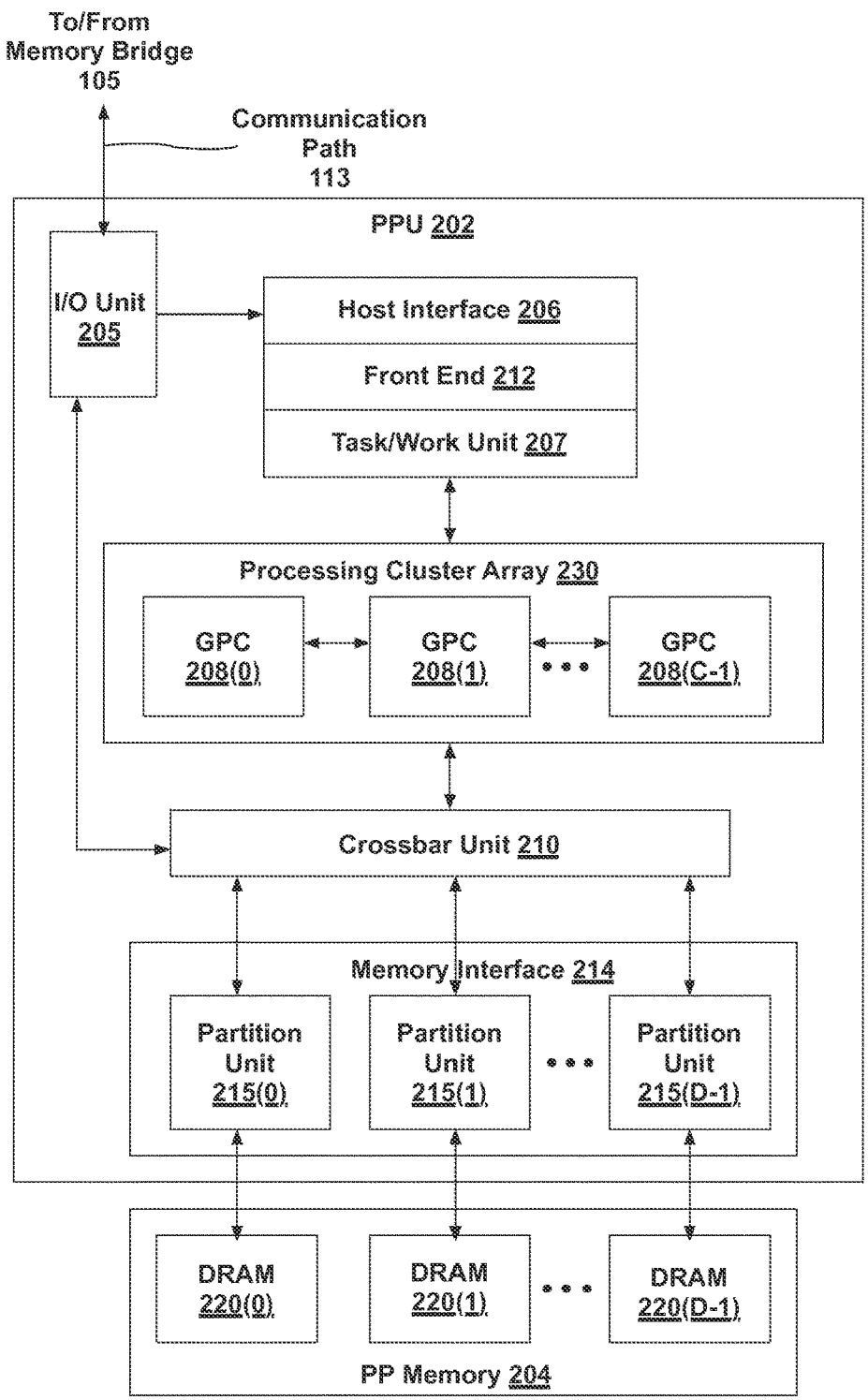
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system on chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Techniques for Nonlinear Chrominance Upsampling

Figure 3:
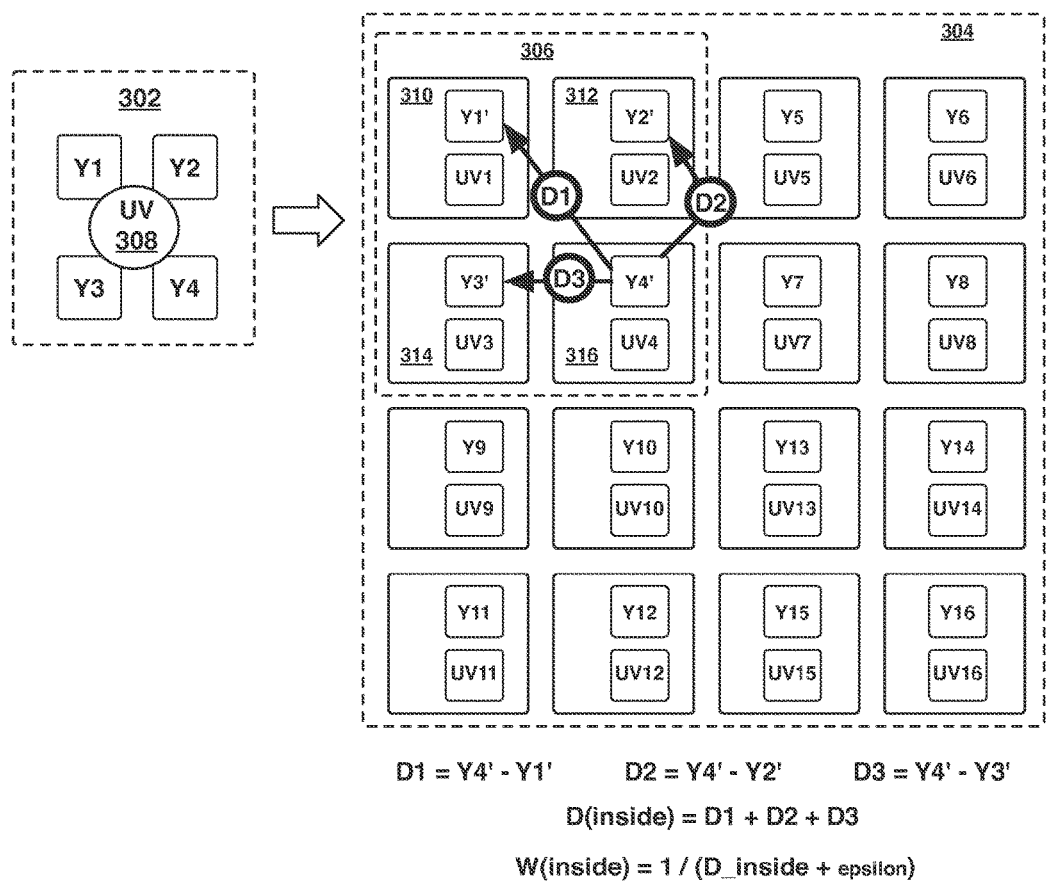
FIG. 3 illustrates upsampling of a pixel group, according to various embodiments of the present invention.

FIG. 3 illustrates upsampling of a pixel group 302, according to various embodiments of the present invention. As shown, pixel group 302 includes a two-by-two block of four pixels in YUV 4:2:0 format. The four pixels result from subsampling a YUV 4:4:4 pixel group (not shown). The luminance of each of the four pixels included in pixel group 302, specifically luminance Y1, luminance Y2, luminance Y3, and luminance Y4, are at full resolution.

The chrominance values of all four pixels included in pixel group 302 are equal to chrominance UV 308. Chrominance UV 308 results from the subsampling process which generates the average of four full resolution YUV 4:4:4 source pixels (not shown). Thus chrominance UV 308 represents a subsampling at one quarter resolution.

As further shown, pixel group 304 includes a four-by-four block of sixteen pixels in YUV 4:4:4 format. The sixteen pixels result from upsampling YUV 4:2:0 pixel group 302 along with three other similar YUV 4:2:0 pixel blocks (not shown). The luminance of each of the sixteen upsampled pixels included in pixel group 304 is equal to the full resolution luminance of each of the subsampled pixels in pixel group 302 and similar pixel groups. For example, the luminance values within pixel group 306 correspond to the luminance values within pixel group 302. Specifically, luminance Y1 is equal to luminance Y1'; luminance Y2 is equal to luminance Y2'; luminance Y3 is equal to luminance Y3'; and luminance Y4 is equal to luminance Y4'.

Close correlation exists between luminance and chrominance. Because of the close correlation between luminance and chrominance, the variation in the luminance values of pixels within a group of pixels subsampled to YUV 4:2:0 may be analyzed to provide guidance in decoding the subsampled chrominance value in order to upsample to YUV 4:4:4.

In order to determine a relationship between a target chrominance UV4 and the chrominances, UV1, UV2, and UV3, of the three neighbor pixels within pixel group 306, encode/decode engine 128 examines the relationship between the corresponding luminances, Y4' and Y1', Y2', and Y3'.

Specifically, encode/decode engine 128 computes a distance function, D(inside), between luminance Y4' of pixel 316 and the luminance of each of its neighbor pixels (pixel 310, pixel 312, and pixel 314) within pixel group 306 Distance function, D(inside), is included in the derivation of a probability that the difference between the value of target chrominance UV4 and the value of chrominance UV308 is less than a threshold value.

As shown, encode/decode engine 128 computes the distance function, D1, between Y4' and Y1'. Encode/decode engine 128 then computes the distance function, D2, between Y4' and Y2'. Finally, encode/decode engine 128 computes the distance function, D3, between Y4' and Y3'. Encode/decode engine 128 then computes the composite distance function, D(inside), as the sum of the three distances, D1, D2, and D3.

As further shown, encode/decode engine 128 then computes a weighting factor, W_inside, as the inverse of the distance function, D(inside) plus some epsilon, where epsilon is an infinitesimal value included to preclude division by zero. Weighting factor, W_inside, is included in the derivation of probabilities as described in detail below in conjunction with FIG. 7.

Figure 4:
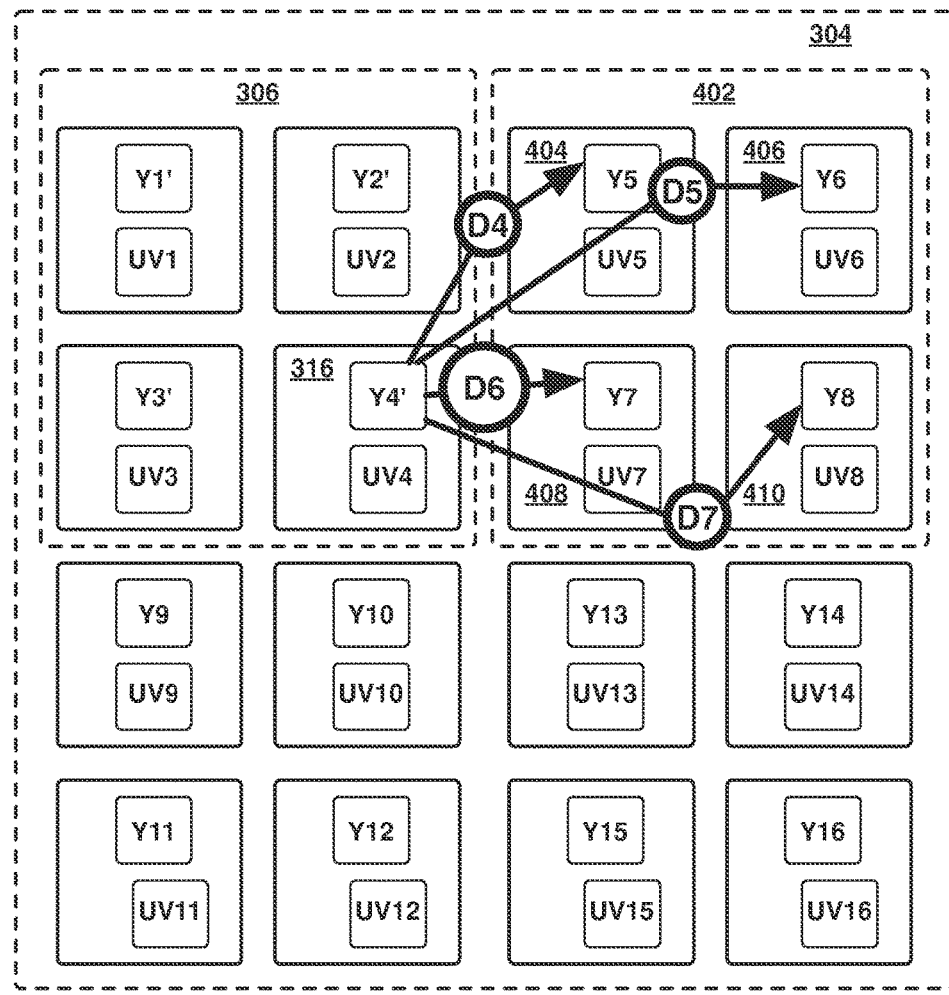
FIG. 4 illustrates a comparison of the luminance value of a target pixel and the luminance values within an adjacent pixel group, according to various embodiments of the present invention.

FIG. 4 illustrates a comparison of the luminance value Y4' of a target pixel 316 and the luminance values, Y5 through Y8, within an adjacent pixel group 402, according to various embodiments of the present invention. As shown, pixel group 402 includes a two-by-two block of four pixels in YUV 4:2:0 format. The four pixels result from upsampling a YUV 4:2:0 pixel group (not shown). The luminance of each of the four pixels included in pixel group 402, specifically luminance Y5, luminance Y6, luminance Y7, and luminance Y8, are at full resolution.

In order to determine a relationship between target chrominance UV4 and the chrominances, UV5, UV6, UV7, and UV8, of the four pixels within neighboring pixel group 402, encode/decode engine 128 examines the relationship between the corresponding luminances, Y4' and Y5', Y6', Y7', and Y8'.

Specifically, encode/decode engine 128 computes the distance function, D4, between Y4' and Y5. Encode/decode engine 128 then computes the distance function, D5, between Y4' and Y6. Encode/decode engine 128 then computes the distance function, D6, between Y4' and Y7. Finally, encode/decode engine 128 computes the distance function, D7, between Y4' and Y8. Encode/decode engine 128 then computes the composite distance function, D(outside_1), as the sum of the four distance functions, D4, D5, D6 and D7. Encode/decode engine 128 computes a weighting function that is the inverse of composite distance function D(outside_1). Encode/decode engine 128 includes the weighting function in generating a composite weighting function, W(outside) as described in detail in conjunction with FIG. 6.

Figure 5:
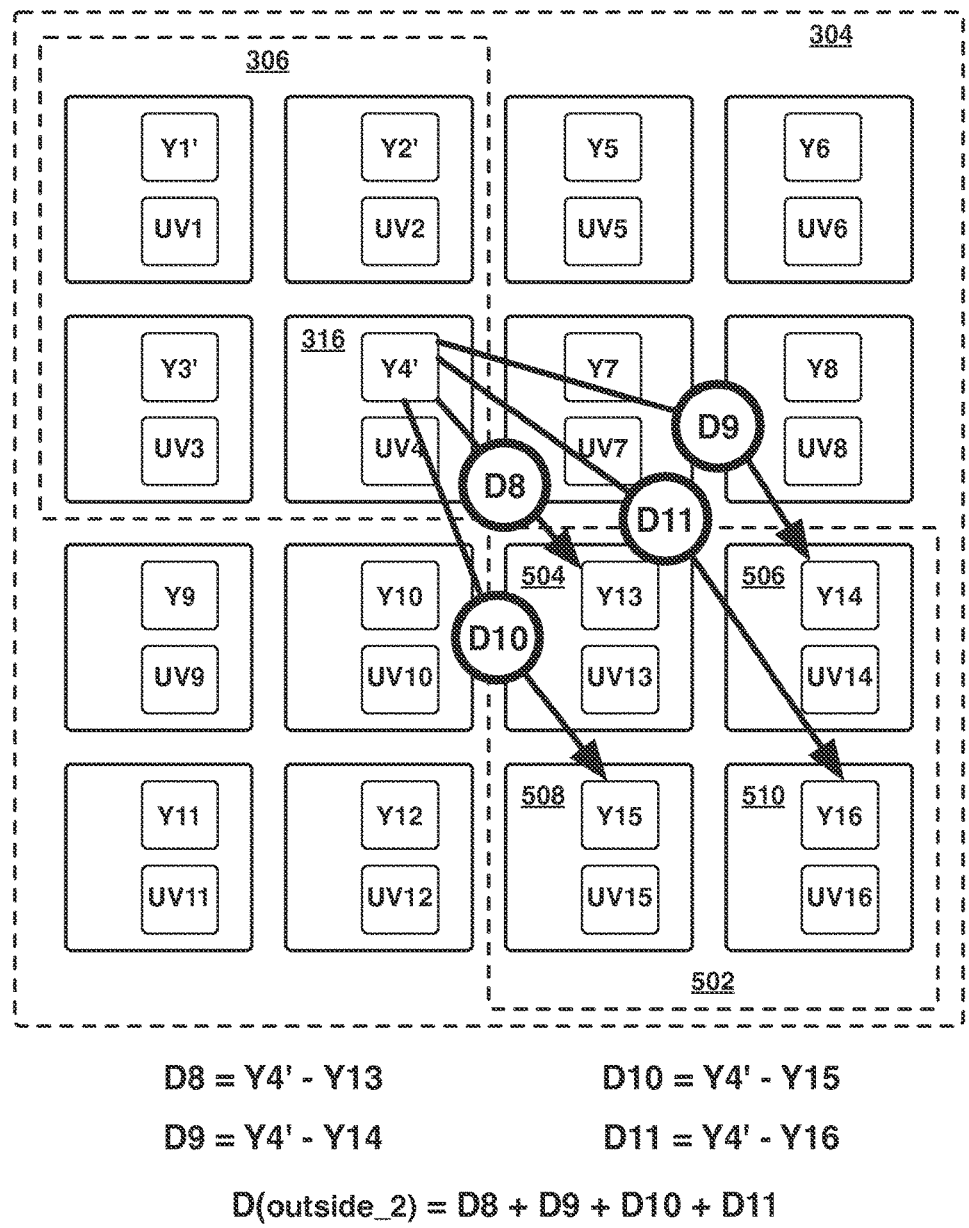
FIG. 5 illustrates a comparison of the luminance value of a target pixel and the luminance values within another adjacent pixel group, according to various embodiments of the present invention.

FIG. 5 illustrates a comparison of the luminance value of a target pixel Y4' and the luminance values, Y12 through Y16, within another adjacent pixel group 502, according to various embodiments of the present invention. As shown, pixel group 502 includes a two-by-two block of four pixels in YUV 4:2:0 format. The four pixels result from upsampling a YUV 4:2:0 pixel group (not shown). The luminance of each of the four pixels included in pixel group 402, specifically luminance Y13, luminance Y14, luminance Y15, and luminance Y16, are at full resolution.

In order to determine a relationship between target chrominance UV4 and the chrominances, UV13, UV14, UV15, and UV16, of the four pixels within neighboring pixel group 502, encode/decode engine 128 examines the relationship between the corresponding luminances, Y4' and Y13, Y14, Y15, and Y16.

Specifically, encode/decode engine 128 computes the distance function, D8, between Y4' and Y13. Encode/decode engine 128 then computes the distance function, D9, between Y4' and Y14. Encode/decode engine 128 then computes the distance function, D10, between Y4' and Y15. Finally, encode/decode engine 128 computes the distance function, D11, between Y4' and Y16. Encode/decode engine 128 then computes the composite distance function, D(outside_2), as the sum of the four distance functions, D8, D9, D10 and D11. Encode/decode engine 128 computes a weighting function that is the inverse of composite distance function D(outside_2). Encode/decode engine 128 includes the weighting function in generating a composite weighting function, W(outside) as described in detail in conjunction with FIG. 6.

Figure 6:
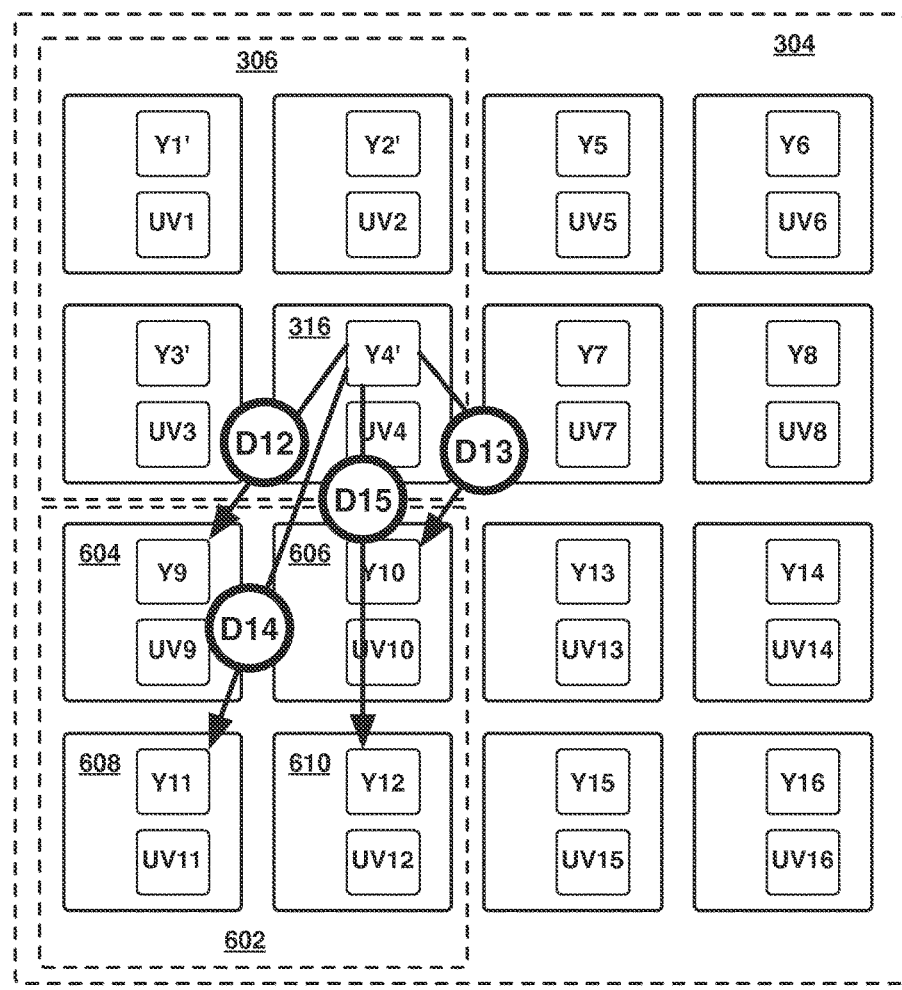
FIG. 6 illustrates a comparison of luminance within yet another pixel group adjacent to the target group, according to various embodiments of the present invention.

FIG. 6 illustrates a comparison of the luminance value of a target pixel Y4' and the luminance values, Y9 through Y12, within another adjacent pixel group 602, according to various embodiments of the present invention. As shown, pixel group 602 includes a two-by-two block of four pixels in YUV 4:2:0 format. The four pixels result from upsampling a YUV 4:2:0 pixel group (not shown). The luminance of each of the four pixels included in pixel group 502, specifically luminance Y9, luminance Y10, luminance Y11, and luminance Y12, are at full resolution.

In order to determine a relationship between target chrominance UV4 and the chrominances, UV9, UV10, UV11, and UV12, of the four pixels within neighboring pixel group 602, encode/decode engine 128 examines the relationship between the corresponding luminances, Y4' and Y9, Y10, Y11, and Y12.

Specifically, encode/decode engine 128 computes the distance function, D12, between Y4' and Y9. Encode/decode engine 128 then computes the distance function, D13, between Y4' and Y10. Encode/decode engine 128 then computes the distance function, D14, between Y4' and Y11. Finally, encode/decode engine 128 computes the distance function, D15, between Y4' and Y12. Encode/decode engine 128 then computes the composite distance function, D(outside_3), as the sum of the four distance functions, D12, D13, D14 and D15. Encode/decode engine 128 computes a weighting function that is the inverse of composite distance function D(outside_3).

As shown, encode/decode engine 128 computes a composite weighting function, W(outside), that is the inverse of the sum of the three distance functions, D(outside_1), D(outside_2), and D(outside_3), plus some epsilon, where epsilon is an infinitesimal value included to preclude division by zero. Encode/decode engine 128 includes weighting function, W(outside), in generating a probability that the difference between target chrominance UV4 and a chrominance value outside of pixel group 306 is less than a threshold value, as described in detail in conjunction with FIG. 7.

Figure 7:
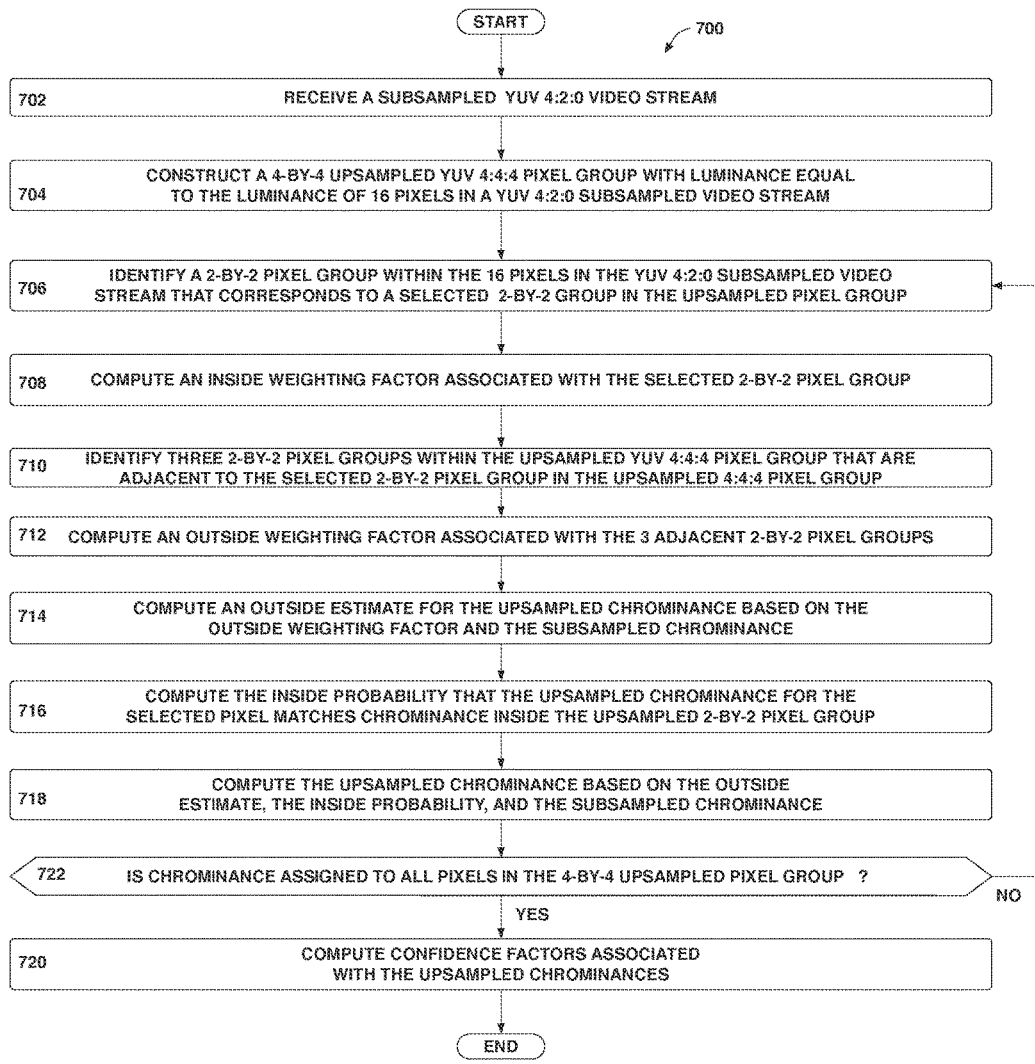
FIG. 7 is a flow diagram of method steps for upsampling compressed video, according to various embodiments of the present invention.

FIG. 7 is a flow diagram of method steps for upsampling compressed video, according to various embodiments of the present invention. Although the method steps are described in conjunction with the systems of FIGS. 1-6, persons skilled in the art will understand that any system configured to perform the method steps, in any order, is within the scope of the various embodiments.

As shown, a method 700 begins at step 702, where encode/decode engine 128 receives a subsampled video stream in YUV 4:2:0 format. At step 704, encode/decode engine 128 constructs a four-by-four upsampled YUV 4:4:4 pixel group 304 with luminance equal to the luminance of sixteen pixels within the subsampled video stream.

At step 706, encode/decode engine 128 identifies 2-by-2 pixel group 302 that corresponds to a selected 2-by-2 pixel group 306 in the upsampled pixel group 304. The four pixels in pixel group 302, (pixel 310, pixel 312, pixel 314, and pixel 318), correspond to the four pixels included in pixel group 302, in that the luminance value of each pixel included in pixel group 302 corresponds to the luminance value of a pixel within pixel group 304. Specifically, luminance Y1 is equal to luminance Y1', luminance Y2 is equal to luminance Y2', luminance Y3 is equal to luminance Y3', and luminance Y4 is equal to luminance Y4'. At step 708, encode/decode engine 128 computes an inside weighting factor, W(inside), associated with the selected 2-by-2 pixel group 304.

At step 710, encode/decode engine 128 identifies three 2-by-2 pixel groups (pixel group 402, pixel group 502, and pixel group 602) within upsampled pixel group 304 that are adjacent to pixel group 306. At step 712, encode/decode engine 128 computes an outside weighting factor, W(outside), which is the inverse of the sum of the three distance functions of the adjacent pixel groups (pixel group 402, pixel group 502, and 602) plus some epsilon, where epsilon is an infinitesimal value included to preclude division by zero.

At step 714, encode/decode engine 128 computes an outside estimate, E(outside), for the upsampled chrominance, as shown in Equation 4, based on the outside weighting factor, W(outside), and the subsampled chrominance, UV 308.

$$E(\text{outside}) = UV308 \times W(\text{outside}) \qquad (4)$$

At step 716, encode/decode engine 128 computes an inside probability, as shown in Equation 5, that the difference between the upsampled chrominance UV4 for the selected pixel and the chrominance inside the upsampled 2-by-2 pixel group 306 is less than a threshold value.

$$P(\text{inside}) = (W(\text{inside})/(W(\text{inside}) - W(\text{outside})) \times (1 - W(\text{inside})^2) \qquad (5)$$

At step 718, encode/decode engine 128 computes the upsampled chrominance, UV4, as shown in Equation 6, based on the outside estimate, E(outside), the inside probability, P(inside), and the subsampled chrominance, UV 308.

$$UV4 = UV308 \times P(\text{inside}) + E(\text{outside}) \times (1 - P(\text{inside})) \qquad (6)$$

At step 720, encode/decode engine 128 determines if the upsampled chrominance for all pixels in the data stream have been computed. If encode/decode engine 128 determines that the upsampled chrominance for all pixels in the data stream have not been computed, method 700 returns to step 706 where encode/decode engine 128 analyzes a next pixel chrominance. If encode/decode engine 128 determines that the upsampled chrominance for all pixels in the data stream have been computed, the method proceeds to step 722.

At step 722, encode/decode engine 128 computes confidence factors associated with the upsampled chrominance UV4. Specifically, encode/decode engine 128 computes an error factor, as show in Equation 7. The error factor indicates the difference between the average of the four upsampled chrominance values and the received subsampled chrominance. Perfect upsampling results in an error term of zero. Further, encode/decode engine 128 computes a correlation factor, as shown in Equation 8.

$$\text{Error} = UV308 - (UV1 + UV2 + UV3 + UV4)/4 \quad (7)$$

$$\text{Correlation} = W\_out\_n/(W\_out\_0 + W\_out\_1 + W\_out\_2 + W\_out\_3) \quad (8)$$

Encode/decode engine 128 computes confidence factors associated with all upsampled chrominances, UV1 through UV16. Method 700 then ends.

The upsampling algorithm is described herein with reference to a YUV 4:2:0 subsampled video stream. The upsampling algorithm is not limited to YUV 4:2:0 video but is applicable to any such conversion scheme such as, for example, and without limitation, a compression algorithm for RGB video in which the R and B components are subsampled and the G component is full resolution.

In sum, a subsystem configured to upsample a video data stream encoded in YCrCb 4:2:0 format (also termed YUV 4:2;0) performs an algorithm upon a two-by-two group of subsampled pixels. The subsystem computes an inside probability that the chrominance of a target pixel is a close match to the chrominance inside the group of four pixels. The subsystem further computes three weighting factors relating the chrominance of the target pixel to each of three adjacent pixels in an upsampled four-by-four pixel group. The subsystem then computes an outside estimate of the chrominance based on the weighting factors. Finally, the subsystem computes the chrominance of the target pixel based on the inside probability, the outside estimate, and the subsampled chrominance. The subsystem performs the algorithm upon all two-by-two groups of four pixels within a subsampled YUV 4:2:0 video data stream and generates an upsampled YUV 4:4:4 video data stream.

At least one advantage of the techniques described herein is that by analyzing the luminance of pixels adjacent to a target pixel, the encode/decode engine may determine a statistically more accurate estimate of the source chrominance. Thus, with a high contrast rendered video arrangement, for example, a subsampled black line on a white background, the processor is statistically more likely to render the upsampled video as a more faithful representation of the full resolution source video.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for upsampling compressed video, the method comprising:
   receiving an encoded video data stream;
   identifying a first pixel within the encoded video data stream;
   determining a first chrominance value associated with the first pixel;
   computing a probability that a difference between a second chrominance value associated with a second pixel within a decoded video data stream is equal to and the first chrominance value is below a first threshold;
   computing the second chrominance value based on the probability and the first chrominance value, wherein the second chrominance value represents a decoded chrominance value of the first pixel; and
   generating at least the second pixel in the decoded video stream that includes the second chrominance value.

2. The computer-implemented method of claim 1 further comprising:
   determining a first luminance value associated with the first pixel;
   determining a second luminance value associated with the second pixel; and
   determining a first difference between the first luminance value and the second luminance value, wherein the first difference represents a correlation between the first pixel and the second pixel.

3. The computer-implemented method of claim 2 further comprising computing a first weighting function based on the first difference, wherein the first weighting function normalizes the first difference.

4. The computer-implemented method of claim 3 further comprising:
   determining a third luminance value associated with a third pixel;
   determining a fourth luminance value associated with a fourth pixel; and
   determining a second difference between the third luminance value and the fourth luminance value, wherein the second difference represents a correlation between the third pixel and the fourth pixel.

5. The computer-implemented method of claim 4 further comprising computing a second weighting function based on the second difference, wherein the second weighting function normalizes the second difference.

6. The computer-implemented method of claim 5 further comprising computing a first value based on the first chrominance value and the second weighting function, wherein the first value represents an approximation of the decoded chrominance value of the first pixel.

7. The computer-implemented method of claim 6 further comprising computing the probability based on the first weighting function and the second weighting function, wherein the probability represents a confidence level in the approximation.

8. The computer-implemented method of claim 6 further comprising computing a second value based on the first value, the first chrominance value, and the probability, and wherein the second value represents the decoded chrominance value of the first pixel.

9. A non-transitory computer-readable medium that, when executed by a processor, causes the processor to upsample compressed video, by performing steps of:
   receiving an encoded video data stream;
   identifying a first pixel within the encoded video data stream;
   determining a first chrominance value associated with the first pixel;
   computing a probability that a difference between a second chrominance value associated with a second pixel within a decoded video data stream is equal to and the first chrominance value is below a first threshold;
   computing the second chrominance value based on the probability and the first chrominance value, wherein the second chrominance value represents a decoded chrominance value of the first pixel; and
   generating at least the second pixel in the decoded video stream that includes the second chrominance value.

10. The non-transitory computer-readable medium of claim 9, wherein the encoded video data stream comprises a YUV 4:2:0 video data stream.

11. The non-transitory computer-readable medium of claim 9, wherein the decoded video data stream comprises an RGB 4:4:4 video data stream.

12. The non-transitory computer-readable medium of claim 9 further comprising:
    determining a first luminance value associated with the first pixel;
    determining a second luminance value associated with the second pixel; and
    determining a first difference between the first luminance value and the second luminance value, wherein the first difference represents a correlation between the first pixel and the second pixel.

13. The non-transitory computer-readable medium of claim 12 further comprising:
    determining a third luminance value associated with a third pixel;
    determining a fourth luminance value associated with a fourth pixel; and
    determining a second difference between the third luminance value and the fourth luminance value, wherein the second difference represents a correlation between the third pixel and the fourth pixel.

14. The non-transitory computer-readable medium of claim 13 further comprising computing a second weighting function based on the second difference, wherein the second weighting function normalizes the second difference.

15. The non-transitory computer-readable medium of claim 14 further comprising computing a first value based on the first chrominance value and the second weighting function, wherein the first value represents an approximation of the decoded chrominance value of the first pixel.

16. The non-transitory computer-readable medium of claim 15 further comprising computing the probability based on a first weighting function and the second weighting function, wherein the probability represents a confidence level in the approximation.

17. A computer system configured to upsample compressed video, comprising:
    a parallel processing subsystem that performs graphics processing;
    a decode engine included in the parallel processing subsystem that performs operations to compress and decompress data; and
    a device driver stored in a memory that is coupled to the parallel processing subsystem and:
    receives an encoded video data stream;
    identifies a first pixel within the encoded video data stream;
    determines a first chrominance value associated with the first pixel;

computes a probability that a difference between a second chrominance value associated with a second pixel within a decoded video data stream is equal to and the first chrominance value is below a first threshold;

computes the second chrominance value based on the probability and the first chrominance value, wherein the second chrominance value represents a decoded chrominance value of the first pixel; and generates at least the second pixel in the decoded video stream that includes the second chrominance value.

18. The computer system of claim 17, wherein the second pixel resides within a first group of four pixels that includes the first pixel.

19. The computer system of claim 17, wherein the device driver:

determines a first luminance value associated with the first pixel;

determines a second luminance value associated with the second pixel;

determines a first difference between the first luminance value and the second luminance value:

determines a third luminance value associated with a third pixel;

determines a fourth luminance value associated with a fourth pixel; and determines a second difference between the third luminance value and the fourth luminance value, wherein the second difference represents a correlation between the third pixel and the fourth pixel.

20. The computer system of claim 19, wherein the third pixel and the fourth pixel reside within a second group of four pixels that is related to a first group of four pixels that includes the first pixel.

* * * * *